United States Patent
Hodgson et al.

(10) Patent No.: US 12,066,083 B2
(45) Date of Patent: *Aug. 20, 2024

(54) GEAR SYSTEMS WITH VARIABLE SPEED DRIVE

(71) Applicant: PRATT & WHITNEY CANADA CORP., Longueuil (CA)

(72) Inventors: Jonathan Hodgson, Kenilworth (GB); Vlastislav Fric, Lovosice (CZ)

(73) Assignee: PRATT & WHITNEY CANADA CORP., Longueuil (CA)

( * ) Notice: Subject to any disclaimer, the term of this patent is extended or adjusted under 35 U.S.C. 154(b) by 66 days.

This patent is subject to a terminal disclaimer.

(21) Appl. No.: 17/977,158

(22) Filed: Oct. 31, 2022

(65) Prior Publication Data
US 2023/0120753 A1    Apr. 20, 2023

Related U.S. Application Data

(63) Continuation of application No. 17/230,419, filed on Apr. 14, 2021, now Pat. No. 11,486,472.

(Continued)

(51) Int. Cl.
*B60K 17/16* (2006.01)
*B60K 17/02* (2006.01)
(Continued)

(52) U.S. Cl.
CPC ............... *F16H 3/72* (2013.01); *B64D 35/00* (2013.01); *F16H 3/666* (2013.01); *F16H 2200/2007* (2013.01)

(58) Field of Classification Search
CPC .... F16H 3/72; F16H 2200/2007; F16H 3/666; B64D 35/00; F02B 41/10; F02B 39/06
See application file for complete search history.

(56) References Cited

U.S. PATENT DOCUMENTS 3,853,432 A * 12/1974 Cronstedt ............... F02C 3/113
                                                                60/39.08
4,445,337 A   5/1984 McCreary
(Continued)

FOREIGN PATENT DOCUMENTS

BR     MU8701724 U2    6/2009
BR     PI0702882 A2    3/2011
(Continued)

OTHER PUBLICATIONS

Extended European Search Report for European Patent Application No. EP21168716.5, dated Aug. 25, 2021.

*Primary Examiner* — Tinh Dang
(74) *Attorney, Agent, or Firm* — NORTON ROSE FULBRIGHT CANADA LLP

(57) ABSTRACT

An epicyclic gear system includes an input sun gear configured to receive rotational input from a turbine of a turbo charger. A first set of planet gears is distributed around and meshes with the input sun gear. A carrier holds the first set of planet gears and defines a rotational axis about which the carrier rotates. A second set of planet gears is mounted to the carrier. An output sun gear is included, wherein the second set of planet gears are distributed around and mesh with the output sun. The output sun gear is configured to deliver rotational power to an internal combustion engine. The carrier is configured to selectively be driven by a variable speed drive to regulate output to the output sun over a range of input rotational speeds of the input sun gear.

14 Claims, 4 Drawing Sheets

Related U.S. Application Data

(60) Provisional application No. 63/010,894, filed on Apr. 16, 2020.

(51) Int. Cl.
  *B60K 23/04* (2006.01)
  *B64D 35/00* (2006.01)
  *F02B 39/04* (2006.01)
  *F02B 41/10* (2006.01)
  *F16H 3/72* (2006.01)
  *F16H 48/22* (2006.01)
  *F16H 48/36* (2012.01)
  *F16H 3/66* (2006.01)

(56) References Cited

U.S. PATENT DOCUMENTS

| | | | |
|---|---|---|---|
| 4,815,334 A * | 3/1989 | Lexen | B60K 6/12 |
| | | | 74/661 |
| 5,947,854 A * | 9/1999 | Kopko | F16H 3/72 |
| | | | 475/2 |
| 6,179,072 B1 | 1/2001 | Hou | |
| 6,198,183 B1 | 3/2001 | Baeumel et al. | |
| 6,335,581 B1 | 1/2002 | Warnke | |
| 6,427,441 B2 | 8/2002 | Wustefeld et al. | |
| 6,537,047 B2 | 3/2003 | Walker | |
| 6,692,395 B2 | 2/2004 | Rodeghiero et al. | |
| 6,895,741 B2 * | 5/2005 | Rago | F02C 7/36 |
| | | | 60/793 |
| 7,022,042 B2 | 4/2006 | Fleytman | |
| 7,098,569 B2 | 8/2006 | Ong et al. | |
| 7,247,967 B2 | 7/2007 | Ionel et al. | |
| 7,303,497 B1 | 12/2007 | Wige | |
| 7,316,629 B2 | 1/2008 | Nakagawa et al. | |
| 7,345,398 B2 | 3/2008 | Purvines et al. | |
| 7,398,946 B1 | 7/2008 | Marshall | |
| 7,418,820 B2 | 9/2008 | Harvey et al. | |
| 7,471,026 B2 | 12/2008 | Bender | |
| 7,503,173 B2 | 3/2009 | Dong et al. | |
| 7,703,283 B2 * | 4/2010 | Barker | F04D 25/028 |
| | | | 475/5 |
| 7,726,426 B2 | 6/2010 | Beck et al. | |
| 7,827,787 B2 | 11/2010 | Cherney et al. | |
| 7,867,122 B2 | 1/2011 | Jones | |
| 7,958,725 B2 | 6/2011 | Elliott | |
| 8,217,544 B2 | 7/2012 | Osada et al. | |
| 8,342,995 B2 | 1/2013 | Grant | |
| 8,382,635 B2 | 2/2013 | Tampieri | |
| 8,397,502 B2 * | 3/2013 | Barker | F01P 7/046 |
| | | | 475/5 |
| 8,435,156 B2 | 5/2013 | Christ | |
| 8,446,121 B1 | 5/2013 | Parsa et al. | |
| 8,471,429 B2 | 6/2013 | Kaiser et al. | |
| 8,495,870 B2 | 7/2013 | Sumiyoshi et al. | |
| 8,531,076 B2 | 9/2013 | Stabenow et al. | |
| 8,535,197 B2 | 9/2013 | Scekic | |
| 8,584,452 B2 | 11/2013 | Lloyd | |
| 8,596,054 B2 | 12/2013 | Law et al. | |
| 8,621,860 B2 | 1/2014 | Hennemann et al. | |
| 8,622,859 B2 | 1/2014 | Babbitt et al. | |
| 8,660,761 B2 | 2/2014 | Anderson et al. | |
| 8,663,047 B2 | 3/2014 | Schroth et al. | |
| 8,710,786 B1 | 4/2014 | Parsa et al. | |
| 8,747,267 B2 | 6/2014 | Sutherland | |
| 8,915,812 B2 | 12/2014 | Haglsperger et al. | |
| 8,943,820 B2 | 2/2015 | Carlton et al. | |
| 8,967,532 B2 | 3/2015 | Vialle | |
| 9,039,566 B2 | 5/2015 | Rudy | |
| 9,051,996 B2 | 6/2015 | During et al. | |
| 9,096,230 B2 | 8/2015 | Ries et al. | |
| 9,102,223 B2 | 8/2015 | Greenwood | |
| 9,109,682 B2 | 8/2015 | Lee et al. | |
| 9,206,885 B2 | 12/2015 | Rekow et al. | |
| 9,261,182 B2 | 2/2016 | Kato et al. | |
| 9,303,727 B2 | 4/2016 | Reimann et al. | |
| 9,343,939 B2 | 5/2016 | Schutten et al. | |
| 9,401,631 B2 | 7/2016 | Wu et al. | |
| 9,447,858 B2 | 9/2016 | Weeramantry et al. | |
| 9,458,864 B2 | 10/2016 | Hyon et al. | |
| 9,546,468 B2 | 1/2017 | Bang | |
| 9,551,400 B2 | 1/2017 | Hiasa et al. | |
| 9,683,585 B2 | 6/2017 | Akiyama et al. | |
| 9,735,638 B2 | 8/2017 | Herz et al. | |
| 9,963,855 B2 | 5/2018 | Jagoda | |
| 9,976,437 B2 | 5/2018 | McCune et al. | |
| 10,000,275 B2 | 6/2018 | Tendola et al. | |
| 10,024,341 B2 | 7/2018 | Zhang et al. | |
| 10,086,946 B1 | 10/2018 | Zywiak et al. | |
| 10,094,295 B2 * | 10/2018 | Ullyott | F02C 3/113 |
| 10,122,227 B1 | 11/2018 | Long | |
| 10,145,291 B1 | 12/2018 | Thomassin et al. | |
| 10,183,744 B2 | 1/2019 | Gamble | |
| 10,287,917 B2 | 5/2019 | Schwarz et al. | |
| 10,374,477 B2 | 8/2019 | Niergarth et al. | |
| 2005/0178893 A1 | 8/2005 | Miller et al. | |
| 2005/0258306 A1 | 11/2005 | Barocela et al. | |
| 2006/0016196 A1 | 1/2006 | Epstein | |
| 2006/0016197 A1 | 1/2006 | Epstein | |
| 2006/0056971 A1 | 3/2006 | D'Anna | |
| 2006/0237583 A1 | 10/2006 | Fucke et al. | |
| 2007/0170307 A1 | 7/2007 | de la Cierva Hoces | |
| 2007/0264124 A1 | 11/2007 | Mueller et al. | |
| 2008/0141921 A1 | 6/2008 | Hinderks | |
| 2008/0145221 A1 | 6/2008 | Sun et al. | |
| 2009/0050103 A1 | 2/2009 | Heaton | |
| 2009/0229897 A1 | 9/2009 | Yutani et al. | |
| 2010/0199666 A1 | 8/2010 | VanDyne et al. | |
| 2010/0264724 A1 | 10/2010 | Nelson et al. | |
| 2010/0285747 A1 | 11/2010 | Bauer et al. | |
| 2011/0215584 A1 | 9/2011 | Prokopich | |
| 2011/0236218 A1 | 9/2011 | Russ et al. | |
| 2011/0243566 A1 | 10/2011 | Truong | |
| 2011/0256973 A1 | 10/2011 | Werner et al. | |
| 2011/0266995 A1 | 11/2011 | Winfield et al. | |
| 2012/0025032 A1 | 2/2012 | Hopdjanian et al. | |
| 2012/0137684 A1 | 6/2012 | Yogev et al. | |
| 2012/0168557 A1 | 7/2012 | Edelson et al. | |
| 2012/0227389 A1 | 9/2012 | Hinderks | |
| 2012/0239228 A1 | 9/2012 | Vos | |
| 2012/0327921 A1 | 12/2012 | Schirrmacher et al. | |
| 2013/0017920 A1 | 1/2013 | Sherrill et al. | |
| 2013/0026304 A1 | 1/2013 | Wang | |
| 2013/0082135 A1 | 4/2013 | Moret | |
| 2013/0119841 A1 | 5/2013 | Graf et al. | |
| 2013/0168489 A1 | 7/2013 | McIntee | |
| 2013/0181088 A1 | 7/2013 | Casado Montero et al. | |
| 2013/0227950 A1 | 9/2013 | Anderson et al. | |
| 2013/0287574 A1 | 10/2013 | Ebbesen et al. | |
| 2013/0300120 A1 | 11/2013 | Podrog | |
| 2013/0341934 A1 | 12/2013 | Kawanishi | |
| 2014/0010652 A1 | 1/2014 | Suntharalingam et al. | |
| 2014/0027568 A1 | 1/2014 | Fleddermann et al. | |
| 2014/0054411 A1 | 2/2014 | Connaulte et al. | |
| 2014/0117148 A1 | 5/2014 | Dyrla et al. | |
| 2014/0203739 A1 | 7/2014 | Chantriaux et al. | |
| 2014/0248168 A1 | 9/2014 | Chantriaux et al. | |
| 2014/0283519 A1 | 9/2014 | Mariotto et al. | |
| 2014/0318132 A1 | 10/2014 | Podrog | |
| 2015/0028594 A1 | 1/2015 | Mariotto | |
| 2015/0076949 A1 | 3/2015 | Alim | |
| 2015/0083852 A1 | 3/2015 | Moser et al. | |
| 2015/0151844 A1 | 6/2015 | Anton et al. | |
| 2015/0184726 A1 * | 7/2015 | Rekow | F16H 37/084 |
| | | | 475/5 |
| 2015/0274306 A1 | 10/2015 | Sheridan | |
| 2015/0311755 A1 | 10/2015 | Hiebl et al. | |
| 2016/0010589 A1 | 1/2016 | Rolt | |
| 2016/0016670 A1 | 1/2016 | Sautreuil et al. | |
| 2016/0017793 A1 | 1/2016 | Johnson | |
| 2016/0076446 A1 | 3/2016 | Bailey Noval et al. | |
| 2016/0218930 A1 | 7/2016 | Toillon et al. | |
| 2016/0305470 A1 | 10/2016 | Remer et al. | |
| 2017/0016398 A1 | 1/2017 | Thiriet et al. | |

(56) References Cited

U.S. PATENT DOCUMENTS

| | | |
|---|---|---|
| 2017/0016399 A1 | 1/2017 | Bedrine et al. |
| 2017/0072755 A1 | 3/2017 | Zhou et al. |
| 2017/0096233 A1 | 4/2017 | Mercier-Calvairac et al. |
| 2017/0152055 A1 | 6/2017 | Mercier-Calvairac et al. |
| 2017/0203839 A1 | 7/2017 | Giannini et al. |
| 2017/0240273 A1 | 8/2017 | Yuen |
| 2017/0241347 A1 | 8/2017 | Marconi et al. |
| 2017/0284408 A1 | 10/2017 | Ricordeau et al. |
| 2017/0305541 A1 | 10/2017 | Vallart et al. |
| 2017/0328282 A1 | 11/2017 | Jensen et al. |
| 2017/0370344 A1 | 12/2017 | Kassianoff |
| 2018/0002025 A1 | 1/2018 | Lents et al. |
| 2018/0003071 A1 | 1/2018 | Lents et al. |
| 2018/0003072 A1 | 1/2018 | Lents et al. |
| 2018/0003109 A1 | 1/2018 | Lents et al. |
| 2018/0118335 A1 | 5/2018 | Gamble et al. |
| 2018/0127103 A1 | 5/2018 | Cantemir |
| 2018/0194483 A1 | 7/2018 | Schwoller |
| 2018/0251226 A1 | 9/2018 | Fenny et al. |
| 2018/0252115 A1 | 9/2018 | Himmelmann et al. |
| 2018/0265206 A1 | 9/2018 | Himmelmann |
| 2018/0266329 A1 | 9/2018 | Mackin |
| 2018/0273197 A1 | 9/2018 | Chang et al. |
| 2018/0319483 A1 | 11/2018 | Mayer et al. |
| 2018/0339786 A1 | 11/2018 | Thomassin et al. |
| 2018/0346111 A1 | 12/2018 | Karem et al. |
| 2019/0101203 A1* | 4/2019 | Hochstetler ............ F16H 55/08 |

FOREIGN PATENT DOCUMENTS

| | | |
|---|---|---|
| BR | PI0622106 | 12/2011 |
| BR | PI1104839 A2 | 11/2012 |
| EP | 0517675 A1 | 12/1992 |
| EP | 2226487 A2 | 9/2010 |
| EP | 2332235 A2 | 6/2011 |
| EP | 2478608 A2 | 7/2012 |
| EP | 2238362 B1 | 3/2015 |
| EP | 3292041 A1 | 3/2018 |
| EP | 3327526 A1 | 5/2018 |
| EP | 3327527 A1 | 5/2018 |
| EP | 3350895 A1 | 7/2018 |
| EP | 3405654 A1 | 11/2018 |
| EP | 3423354 A1 | 1/2019 |
| JP | 2006231974 A | 9/2006 |
| JP | 2006270778 A | 10/2006 |
| JP | 2006290187 A | 10/2006 |
| JP | 2007137423 A | 6/2007 |
| JP | 4215012 B2 | 1/2009 |
| JP | 2009534928 A | 9/2009 |
| JP | 2011516334 A | 5/2011 |
| JP | 4973256 B2 | 7/2012 |
| JP | 2013193533 A | 9/2013 |
| JP | 5415400 B2 | 2/2014 |
| JP | 2014076771 A | 5/2014 |
| JP | 2014159255 A | 9/2014 |
| JP | 2015077089 A | 4/2015 |
| JP | 2015077091 A | 4/2015 |
| JP | 2015137092 A | 7/2015 |
| JP | 5867219 B2 | 2/2016 |
| JP | 2017074804 A | 4/2017 |
| JP | 2017150665 A | 8/2017 |
| JP | 6199496 B2 | 9/2017 |
| JP | 2017165131 A | 9/2017 |
| JP | 6213494 B2 | 10/2017 |
| JP | 2017534514 A | 11/2017 |
| JP | 6376042 B2 | 8/2018 |
| JP | 6397447 B2 | 9/2018 |
| JP | 6430885 B2 | 11/2018 |
| JP | 6433492 B2 | 12/2018 |
| KR | 20070039699 A | 4/2007 |
| KR | 20080086714 A | 9/2008 |
| KR | 20080005377 U | 11/2008 |
| KR | 20090110373 A | 10/2009 |
| KR | 20110032973 A | 3/2011 |
| KR | 20110087661 A | 8/2011 |
| KR | 20120140229 A | 12/2012 |
| KR | 20130006379 A | 1/2013 |
| KR | 101277645 B1 | 6/2013 |
| KR | 20130142491 A | 12/2013 |
| KR | 101438289 B1 | 9/2014 |
| KR | 101572184 B1 | 11/2015 |
| KR | 101659783 B1 | 9/2016 |
| KR | 20160143599 A | 12/2016 |
| KR | 20170004299 A | 1/2017 |
| KR | 101713800 B1 | 3/2017 |
| KR | 101797011 B1 | 11/2017 |
| WO | 2007086213 A1 | 8/2007 |
| WO | 2011005066 A2 | 1/2011 |
| WO | 2011107718 A1 | 9/2011 |
| WO | 2011144188 A1 | 11/2011 |
| WO | 2014108125 A1 | 7/2014 |
| WO | 2014134506 A1 | 9/2014 |
| WO | 2015107368 A1 | 7/2015 |
| WO | 2015145036 A1 | 10/2015 |
| WO | 2016074600 A1 | 5/2016 |
| WO | 2017114643 A1 | 7/2017 |
| WO | 2018044757 A1 | 3/2018 |
| WO | 2018106137 A2 | 6/2018 |
| WO | 2018191769 A1 | 10/2018 |
| WO | 2018211227 A1 | 11/2018 |

\* cited by examiner

GEAR SYSTEMS WITH VARIABLE SPEED DRIVE

CROSS REFERENCE TO RELATED APPLICATIONS

This application is a continuation of U.S. patent application Ser. No. 17/230,419, filed Apr. 14, 2021, which claims priority to U.S. Provisional Patent Application No. 63/010,894, filed Apr. 16, 2020. The entire contents of which are incorporated herein by reference.

BACKGROUND

1. Field

The present disclosure relates to power transfer, and more particularly to transferring power within a power plant for aerospace applications.

2. Description of Related Art

Aircraft power plants, including turboshaft engines, turboprop engines, turbofan engines, hybrid-electric power plants, and the like, can have multiple sources of rotational power. For example in a hybrid-electric power plant there can be an internal combustion engine, one or more turbochargers, and one or more electric motors. One or more transmissions are needed to deliver the power from these sources of rotational power to an air mover such as a propeller.

The conventional techniques have been considered satisfactory for their intended purpose. However, there is an ever present need for improved systems and methods for power transfer in hybrid-electric power plants such as for aerospace applications. This disclosure provides a solution for this need.

SUMMARY

An epicyclic gear system includes an input sun gear configured to receive rotational input from a turbine of a turbo charger. A first set of planet gears is distributed around and meshes with the input sun gear. A carrier holds the first set of planet gears and defines a rotational axis about which the carrier rotates. A second set of planet gears is mounted to the carrier. An output sun gear is included, wherein the second set of planet gears are distributed around and mesh with the output sun. The output sun gear is configured to deliver rotational power to an internal combustion engine. The carrier is configured to selectively be driven by a variable speed drive to regulate output to the output sun over a range of input rotational speeds of the input sun gear.

Each gear of the second set of planet gears can be on a common shaft with a respective one of the gears of the first set of planet gears so the first and second sets of planet gears rotate together about the rotational axis with rotation of the carrier. Each gear of the second set of planet gears can be rotationally fixed relative to the respective one of the planet gears of the first set of planet gears to rotate together around an axis of the respective common shaft as they also revolve around the rotational axis with rotation of the carrier.

The input sun gear can be smaller than the output sun gear. Each gear of first set of planet gears can be larger than each of the respective gears of the second set of planet gears. The system can be devoid of a ring gear surrounding and meshing with the first set of planet gears. The system can be devoid of a ring gear surrounding and meshing with the second set of planet gears.

The variable speed drive can be connected to drive the carrier with variable speed to regulate output to the output sun over a range of input rotational speeds of the input sun gear. The variable speed drive can be a hydraulic system. The variable speed drive can connect directly to drive the carrier without connecting to the carrier by way of a ring gear meshing with the first or second sets of planet gears.

The system can include the internal combustion engine connected to be driven by the output sun gear. The turbo charger turbine can be connected to the input sun gear to provide power to the internal combustion engine. One or more accessory gears can be operatively connected to the output sun gear to drive accessory devices. The variable speed drive can include an input gear operatively connected to the output sun gear to provide input drive to the variable speed drive. The input gear can be mounted to a bearing having a fixed outer race and an inner race that rotates with the input gear relative to the outer race. The variable speed drive can include an output gear operatively connected to drive the carrier, wherein the variable speed drive includes an internal mechanism configured to drive the output gear at a different speed from the input gear, and to vary the ratio of speed difference between the input gear and the output gear. The carrier can be mounted to a bearing having a fixed outer race and an inner race that rotates with the carrier relative to the outer race.

A method includes providing rotational power as input to an input sun gear and driving planet gears with the input sun gear, wherein the planet gears are operatively connected to a carrier to revolve around the input sun gear. The method includes controlling revolution speed of the carrier with a variable speed drive and providing rotational output power from the planet gears to an output sun gear, wherein the rotational output power is speed regulated by controlling revolution speed and direction of the carrier and variable speed drive.

Controlling revolution speed of the carrier with the variable speed drive can include driving the variable speed drive with at least one gear operatively connected to the output sun gear. The method can include varying output speed of the variable speed drive given a constant input speed to the variable speed drive. The method can include varying rotational direction of rotational output of the variable speed drive. Controlling revolution speed of the carrier with the variable speed drive can include altering speed of the carrier to maintain constant output speed of the output sun gear given variable input speed to the input sun gear.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
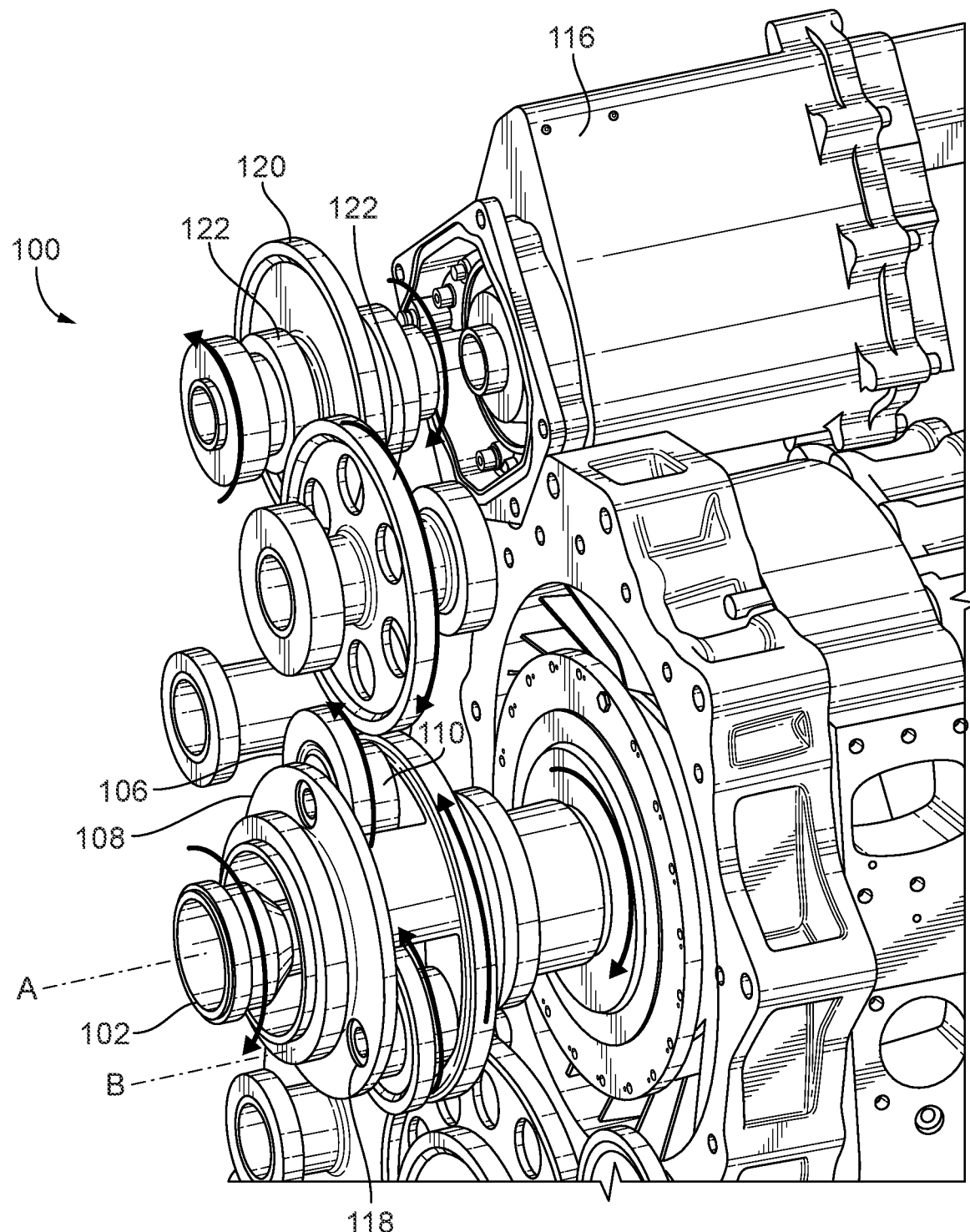
FIG. 1 is a schematic perspective view of an embodiment of a system constructed in accordance with the present disclosure, showing the carrier and planet gears.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to transfer power between a turbine of a turbo charger and an internal combustion engine, e.g. in a hybrid-electric aircraft power plant. Any suitable internal combustion engine can be used, such as a gas turbine, spark ignited, diesel, rotary or reciprocating engine of any fuel type with a configuration of turbomachinery elements, selected from a group consisting of a turbocharger, turbo-supercharger, or supercharger and exhaust recovery turbo compounding, which is mechanically, electrically, hydraulically or pneumatically driven. An example of a rotary engine suitable for this application is disclosed in U.S. Pat. No. 10,145,291, the disclosure of which is herein incorporated by reference in its entirety.

Figure 2:
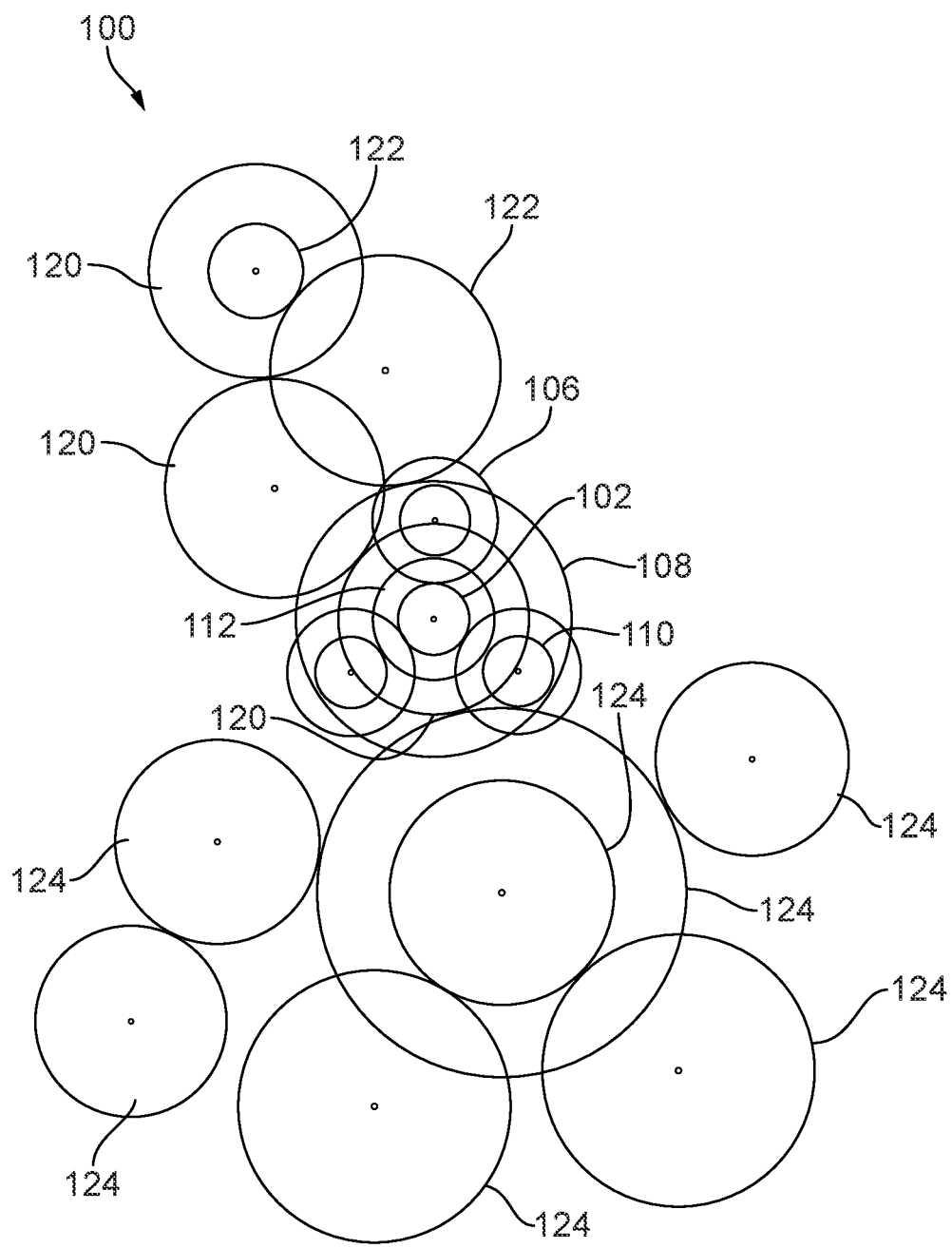
FIG. 2 is a schematic end view of the system of FIG. 1, schematically indicating the meshing of the planet and sun gears.
Figure 3:
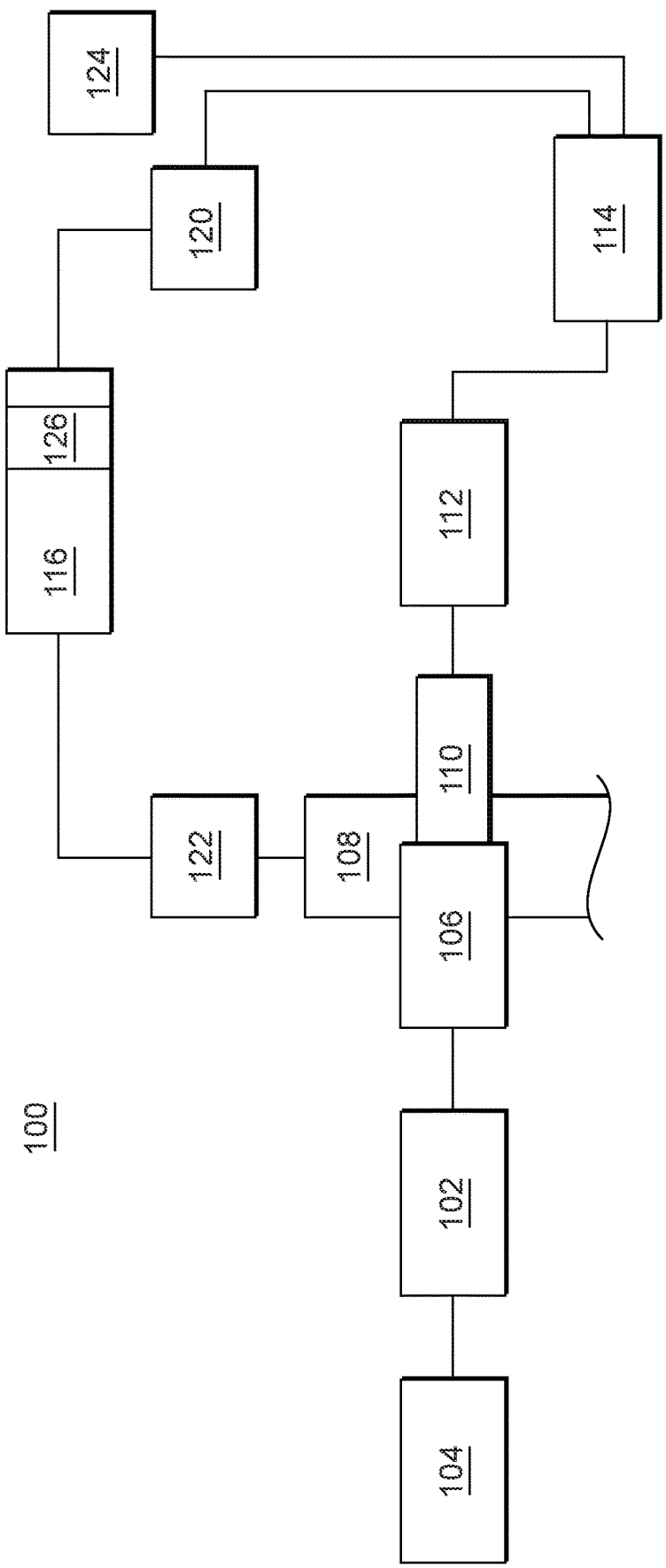
FIG. 3 is a schematic view of the system of FIG. 1, showing the turbine, internal combustion engine, and variable speed drive.
Figure 4:
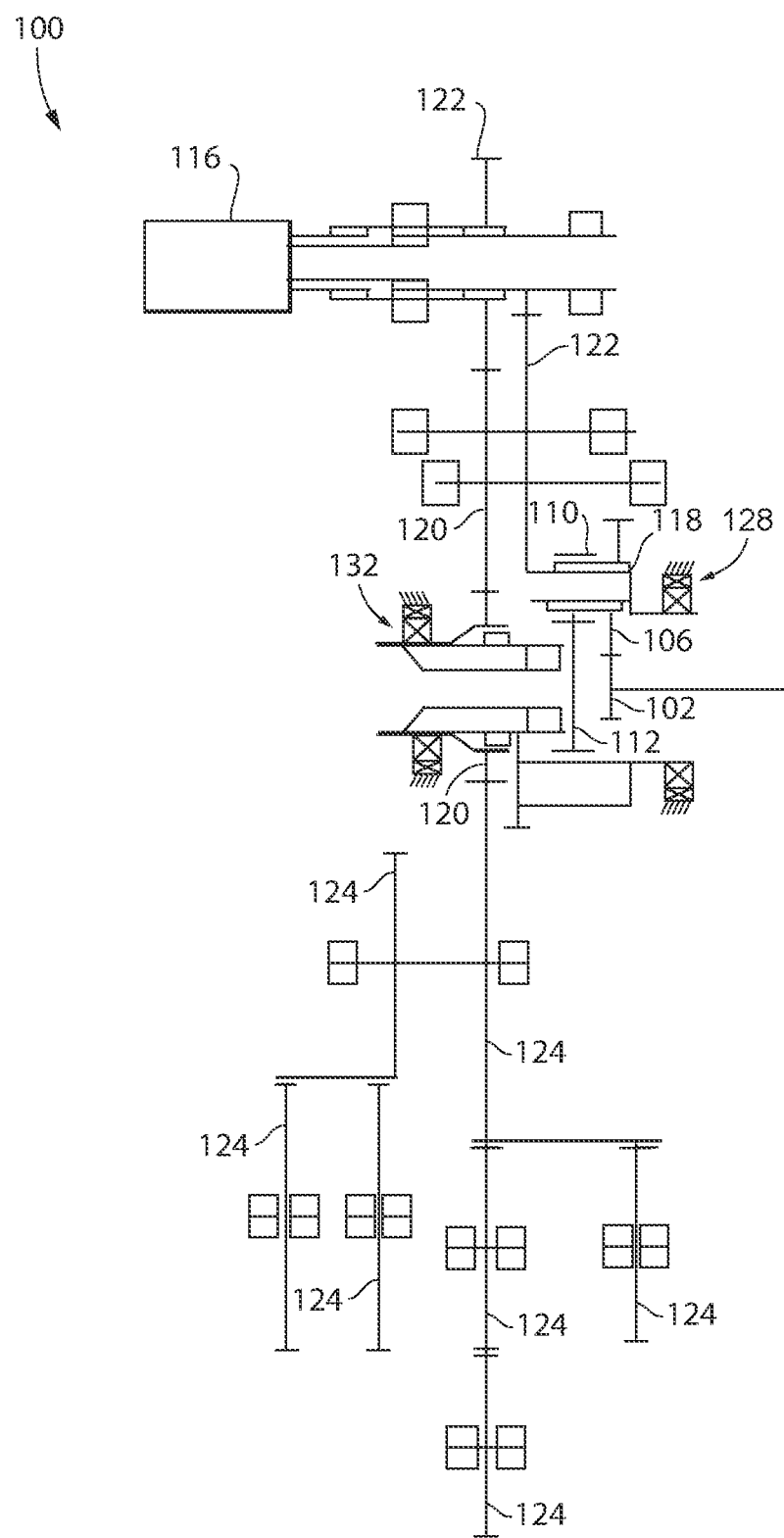
FIG. 4 is a schematic side view of the system of FIG. 1, showing the bearings.

The epicyclic gear system 100 includes an input sun gear 102 configured to receive rotational input from a turbine 104 (shown in FIG. 3) of a turbo charger. A first set of planet gears 106 is distributed around and meshes with the input sun gear 102. A carrier 108 holds the first set of planet gears 106 and defines a rotational axis A about which the carrier 108 rotates. A second set of planet gears 110 is mounted to the carrier 108. An output sun gear 112 (not shown in FIG. 1, but see FIGS. 2-3) is included, wherein the second set of planet gears 110 are distributed around and mesh with the output sun 112, as schematically indicated in FIG. 2. The output sun gear 112 is connected to deliver rotational power to an internal combustion engine 114, as shown in FIG. 3 and any other suitable accessories such as a variable speed drive 116 to supply power to the system 100. The carrier 108 is connected to selectively be driven by the variable speed drive 116 to regulate output to the output sun 112 over a range of input rotational speeds of the input sun gear 102.

Each gear 110 of the second set of planet gears 110 is on a common shaft 118 with a respective one of the gears 106 of the first set of planet gears 106 so the first and second sets of planet gears 106, 110 rotate together about the rotational axis A with rotation of the carrier 108. Each gear 110 of the second set of planet gears 110 is rotationally fixed relative to the respective one of the planet gears 106 of the first set of planet gears 106 to rotate together around an axis B of the respective common shaft 118 as they also revolve around the rotational axis A with rotation of the carrier 108.

The input sun gear 102 is smaller than the output sun gear 112. Each gear 106 of first set of planet gears 106 is larger than each of the respective gears 110 of the second set of planet gears 110. The system 100 is devoid of a ring gear surrounding and meshing with the first set of planet gears 106, or with the second set of planet gears 110.

The variable speed drive 116 is connected by an output gear train including output gears 122 to drive the carrier 108 with variable speed to regulate output to the output sun 112 (e.g. to keep the speed of the output sun 112 constant) over a range of input rotational speeds of the input sun gear 102 (e.g. as the speed of the turbine 104 of FIG. 2 varies). The variable speed drive 116 connect directly to drive the carrier 108 without connecting to the carrier 108 by way of a ring gear meshing with the first or second sets of planet gears 106, 110.

As shown in FIG. 3, the turbo charger turbine 104 connects to the input sun gear 102 to ultimately provide power to the internal combustion engine 114, to which the turbo charger provides turbo charged aspiration. One or more accessory gears 124 can be operatively connected to the output sun gear 112 to drive accessory devices. The variable speed drive 116 is connected to a train of input gears 120 operatively connected to the internal combustion engine 114, e.g., by way of being connected to the output sun gear 112, to provide input drive to the variable speed drive 116. The variable speed drive 116 includes or connects to an output gear train of output gears 122 operatively connected to drive the carrier 108. The variable speed drive 116 is a hydraulic system that includes an internal mechanism 126 (schematically shown in FIG. 3) configured to drive the output gears 122 at a different speed from the input gears 120, and to vary the ratio of speed difference between the input gears 120 and the output gears 122. It is also contemplated that the variable speed drive 116 could include an output gear 122 driven by a battery powered electric motor, or any other suitable driving source, e.g., in lieu of the input gears 120. FIG. 3 schematically shows the flow of power from the internal combustion engine 114 to the input gears which provide power to the variable speed drive 116, and from the variable speed drive 116 to the carrier 108 through the output gears 122. The internal combustion engine 114 also provides power to the accessory gears 124, which are basically in parallel with the input gears 120, for driving other accessories.

With reference now to FIGS. 1-4, the carrier 108 is supported by a bearing 128 that has a fixed outer race and in inner race that rotates with the carrier 108 relative to the outer race. Similarly, the bearing 132 supporting one of the input gears 120 has a fixed outer race and in inner race that rotates with the input gear 120 relative to the outer race. The other bearings shown but not numbered in FIG. 4 can each have rotating inner and outer races.

A method includes providing rotational power as input to an input sun gear (e.g. input sun gear 102) and driving planet gears (e.g. planet gears 106, 110) with the input sun gear, wherein the planet gears are operatively connected to a carrier (e.g. carrier 108) to revolve around the input sun gear. The method includes controlling revolution speed of the carrier with a variable speed drive (e.g. variable speed drive 116) and providing rotational output power from the planet gears to an output sun gear (e.g. output sun gear 112), wherein the rotational output power is speed regulated by controlling revolution speed and direction of the carrier and variable speed drive.

Controlling revolution speed of the carrier with the variable speed drive can include driving the variable speed drive with at least one gear (e.g. input gears 120) operatively connected to the output sun gear. The method can include varying output speed of the variable speed drive given a constant input speed to the variable speed drive. The method can include varying rotational direction of rotational output of the variable speed drive, i.e., the variable speed drive can change rotating the output gears 122 back and forth between clockwise and counterclockwise. Controlling revolution speed of the carrier with the variable speed drive can include altering speed of the carrier to maintain constant output speed of the output sun gear given variable input speed to the input sun gear.

The methods and systems of the present disclosure, as described above and shown in the drawings, provide for transfer of power between the turbine of turbo charger and an internal combustion engine, with variable speed capability. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An epicyclic gear system for an aircraft power plant, the epicyclic gear system comprising:
    an input sun gear receiving rotational input and an output sun gear delivering rotational output;
    a plurality of planet gears rotatably mounted to a carrier and coupling the input sun gear to the output sun gear, the carrier rotatable about a rotational axis;
    a variable speed drive driving the carrier to regulate rotational speed of the carrier to regulate the rotational speed outputted to the output sun gear over a range of input rotational speeds of the input sun gear; and
    one or more accessory gears operatively connected to the output sun gear to drive accessory devices.

2. The epicyclical gear system as recited in claim 1, wherein the plurality of planet gears rotate together about the rotational axis with rotation of the carrier.

3. The epicyclical gear system as recited in claim 1, wherein the input sun gear is smaller than the output sun gear.

4. The epicyclical gear system as recited in claim 1, further comprising the variable speed drive connected to drive the carrier with variable speed to regulate output to the output sun over a range of input rotational speeds of the input sun gear.

5. The epicyclical gear system as recited in claim 4, wherein the variable speed drive is a hydraulic system.

6. An epicyclic gear system for an aircraft power plant, the epicyclic gear system comprising:
    an input sun gear receiving rotational input and an output sun gear delivering rotational output;
    a plurality of planet gears rotatably mounted to a carrier and coupling the input sun gear to the output sun gear, the carrier rotatable about a rotational axis;
    a variable speed drive driving the carrier to regulate rotational speed of the carrier to regulate the rotational speed outputted to the output sun gear over a range of input rotational speeds of the input sun gear, the variable speed drive including an input gear operatively connected to the output sun gear to provide input drive to the variable speed drive.

7. The epicyclical gear system as recited in claim 6, wherein the input gear is mounted to a bearing having a fixed outer race and an inner race that rotates with the input gear relative to the outer race.

8. The epicyclical gear system as recited in claim 6, wherein the variable speed drive includes an output gear operatively connected to drive the carrier, wherein the variable speed drive includes an internal mechanism configured to drive the output gear at a different speed from the input gear, and to vary the ratio of speed difference between the input gear and the output gear.

9. The epicyclical gear system as recited in claim 1, wherein the carrier is mounted to a bearing having a fixed outer race and an inner race that rotates with the carrier relative to the outer race.

10. The epicyclical gear system as recited in claim 1, wherein the input sun gear and the output sun gear are respectively rotational about a common rotational axis.

11. A method of transmitting rotational power from a rotational input to an rotational output in an aircraft power plant, the method comprising:
    receiving the rotational power from the rotational input to an input sun gear of an epicyclic gear system;
    driving planet gears of the epicyclic gear system with the input sun gear, wherein the planet gears are operatively connected to a carrier to revolve around the input sun gear;
    controlling revolution speed of the carrier with a variable speed drive, including driving the variable speed drive with at least one gear operatively connected to the output sun gear; and
    driving an output sun gear of the epicyclic gear system by the planet gears to deliver the rotational power to the rotational output, wherein the rotational power is speed regulated by controlling revolution speed and direction of the carrier and variable speed drive to regulate the output sun gear over a range of input rotational speeds of the input sun gear.

12. The method as recited in claim 11, further comprising using the variable speed drive itself to vary output speed of the variable speed drive while holding input speed to the variable input drive constant.

13. The method as recited in claim 12, further comprising varying rotational direction of rotational output of the variable speed drive.

14. The method as recited in claim 12, wherein controlling revolution speed of the carrier with the variable speed drive includes altering speed of the carrier to maintain constant output speed of the output sun gear given variable input speed to the input sun gear.

* * * * *